US007578982B1

(12) United States Patent
Lin et al.

(10) Patent No.: US 7,578,982 B1
(45) Date of Patent: Aug. 25, 2009

(54) RADIOISOTOPE TI-201 PRODUCTION PROCESS

(75) Inventors: Wuu-Jyh Lin, Longtan Township, Taoyuan County (TW); Ting-Shien Duh, Longtan Township, Taoyuan County (TW); Ying-Ming Tsai, Pingjhen (TW); Sun-Rong Huang, Longtan Township, Taoyuan County (TW); Chien-Hsin Lu, Longtan Township, Taoyuan County (TW); Mao-Hsung Chang, Hsinchu County (TW); Jenn-Tzong Chen, Taipei (TW)

(73) Assignee: Atomic Energy Council- Institute of Nuclear Energy Research, Taoyuan (TW)

( * ) Notice: Subject to any disclaimer, the term of this patent is extended or adjusted under 35 U.S.C. 154(b) by 390 days.

(21) Appl. No.: 11/500,931

(22) Filed: Aug. 9, 2006

(51) Int. Cl.
*C01F 3/00* (2006.01)
*C01F 13/00* (2006.01)
*C01F 15/00* (2006.01)

(52) U.S. Cl. .......................................... 423/2; 423/249

(58) Field of Classification Search ..................... 423/2, 423/249

See application file for complete search history.

(56) References Cited

U.S. PATENT DOCUMENTS 3,993,538 A * 11/1976 Lebowitz et al. ............ 376/195
4,297,166 A * 10/1981 Kato et al. .................. 376/194

FOREIGN PATENT DOCUMENTS

GB 2154047 A * 12/1984

OTHER PUBLICATIONS

L. T. Fairhall, Lead Studies, Chapter XI. A Rapid Method of Analyzing Urine for Lead, From the Laboratories of Physiology, Harvard Medical School, Apr. 11, 1924.*
Hildebrand, et al., Naturwissenschaften, 61, 1974, p. 169-70.*
Binsted, et al., Inorganica Chimica Acta, 2000, 298, pp. 116-119.*
Patnaik, Handbook of Inorganic Chemicals, 2003 pp. 919-959.*

* cited by examiner

*Primary Examiner*—Jerry Lorengo
*Assistant Examiner*—Eli Mekhlin
(74) *Attorney, Agent, or Firm*—Troxell Law Office PLLC

(57) ABSTRACT

A radioisotope TI-201 is produced. The process includes electroplating, irradiating, dissolving, precipitating, ion exchanging, decaying and filtering. The TI-201 obtained is a liquid having a high purity.

4 Claims, 2 Drawing Sheets

RADIOISOTOPE TI-201 PRODUCTION PROCESS

FIELD OF THE INVENTION

The present invention relates to producing TI-201; more particularly, relates to quickly filtering out a high-purity TI-201 liquid.

DESCRIPTION OF THE RELATED ART

TI-201 thallous chloride ($^{201}TICl_2$) can be absorbed by heart muscle to be gathered at the heart muscle. Therefore, TI-201 can be used in a myocardial image for diagnosing heart disease; and can be applied in other medical diagnoses, like a tumor image. Hence, TI-201 is the most commonly used radioisotope in division of nuclear medicine.

To produce a TI-201, as revealed in "Production of TI-201 and Pb 203 via Proton Induced Nuclear Reaction on Natural Thallium," by Qaim S. M., Weinreich R. and Ollig H., International Journal of Applied Radiation and Isotopes, 30 (1979) pp. 85-95, TI-201 is directly washed out. But the TI-201 directly washed out quite often contains impurities so that its purity is not good. Hence, the prior art does not fulfill users' requests on actual use.

SUMMARY OF THE INVENTION

The main purpose of the present invention is to form a TI-203 solid target material through electroplating, irradiate the TI-203 solid target material with a proton beam, dissolve the TI-203 solid target material to process through a first chemical separation and a second chemical separation, and quickly filter out a high-purity TI-201 liquid.

To achieve the above purpose, the present invention is a radioisotope TI-201 production process, where a TI-203 solid target material is obtained from a plated target material of TI-203 through electroplating; the TI-203 solid target material is irradiated with a proton beam by using a cyclotron; the TI-203 solid target material is dissolved with a strong acid liquid to obtain a Pb-201 solution and a TI-203 solution; ammonia and water are added for a precipitation to separate a TI-201 liquid and a Pb-201 liquid out; hydrochloric acid is added for a first ion exchange with a resin while impurities are filtered out; the Pb-201 liquid is taken out to be decayed into a TI-201 liquid; and a hydrochloric acid (HCl) having sulfur dioxide ($SO_2$) is added to the TI-201 liquid to obtain a TI-201 liquid having a high purity through a second ion exchange by using a resin. Accordingly, a novel radioisotope TI-201 production process is obtained.

BRIEF DESCRIPTION OF THE DRAWING

The present invention will be better understood from the following detailed description of the preferred embodiment according to the present invention, taken in con junction with the accompanying drawings, in which.

DESCRIPTION OF THE PREFERRED EMBODIMENT

The following description of the preferred embodiment is provided to understand the features and the structures of the present invention.

Figure 1:
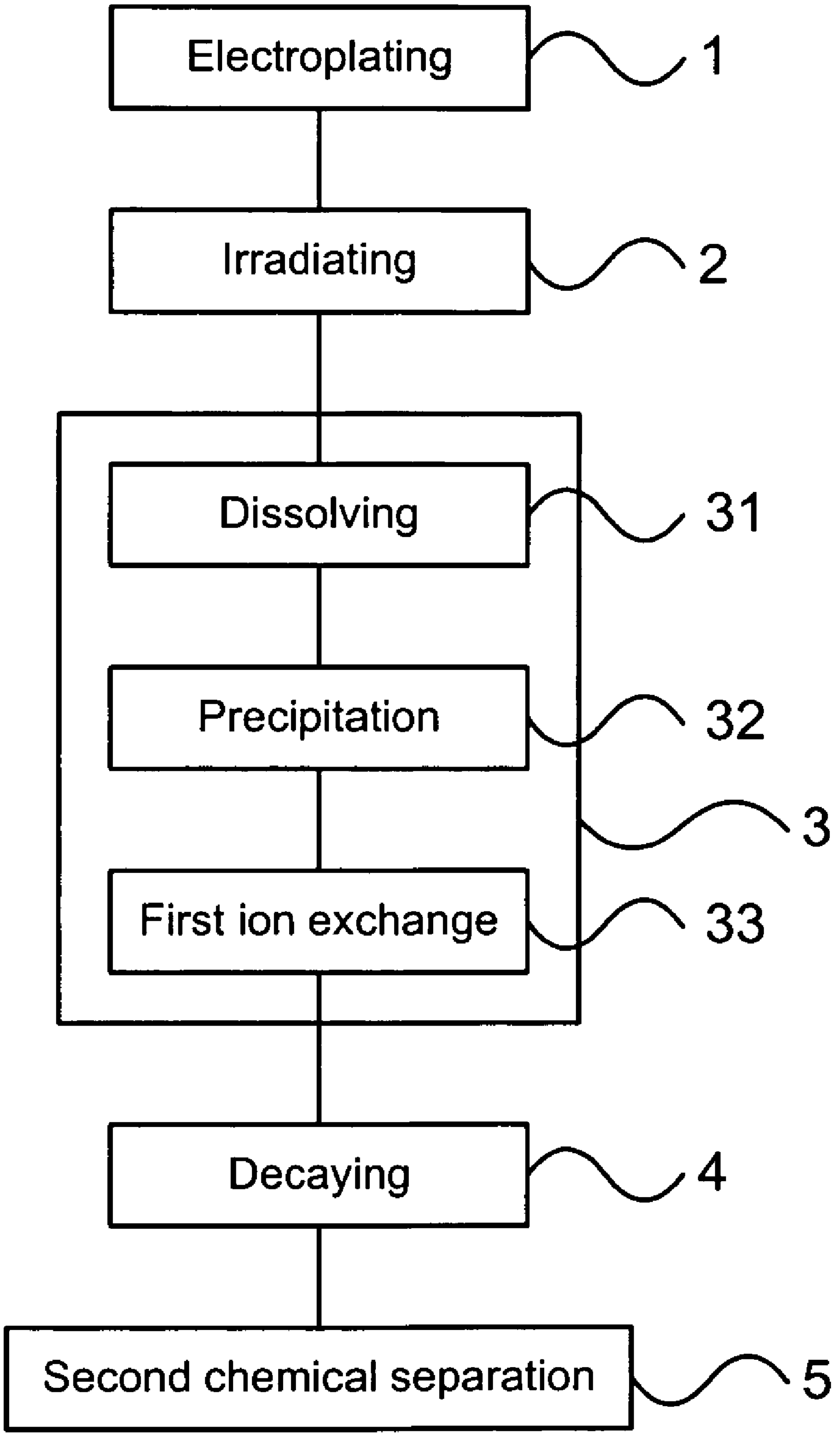
FIG. 1 is the plot view showing the process flow of the preferred embodiment according to the present invention.

Please refer to FIG. 1, which is a plot view showing a process flow of a preferred embodiment according to the present invention. As shown in the figure, the present invention is a radioisotope TI-201 production process, comprising electroplating 1, irradiating 2, processing a first chemical separation 3, decaying 4 and processing a second chemical separation 5, where the first chemical separation 3 comprises dissolving 31, processing a precipitation 32 and processing a first ion exchange 33; and the second chemical separation 5 is a second ion exchange. Thus, a novel radioisotope TI-201 production process is obtained for acquiring a TI-201 liquid having a high purity.

Figure 2:
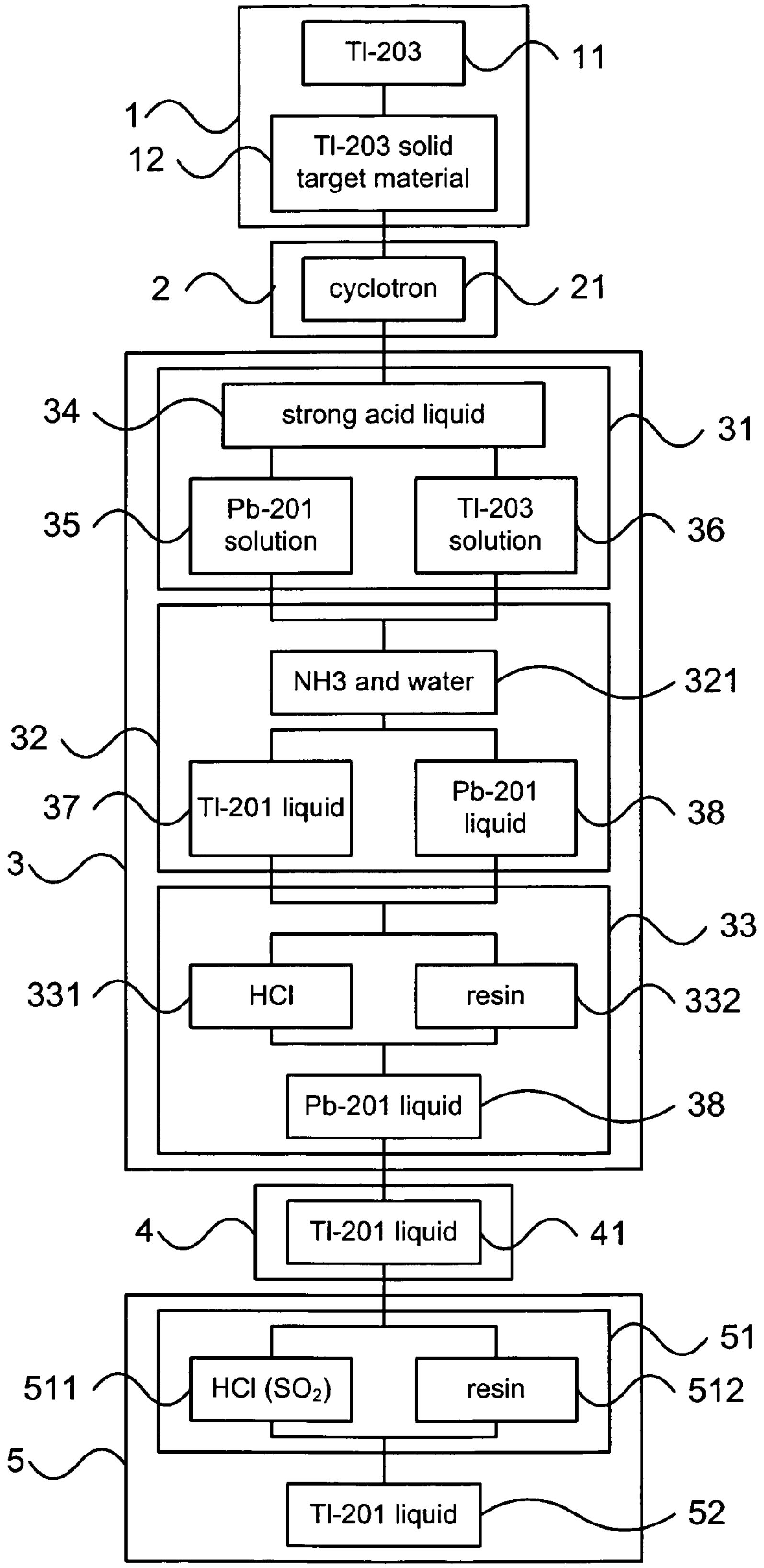
FIG. 2 is the detailed view showing the flow chart of the preferred embodiment.

Please refer to FIG. 2, which is a detailed view showing a flow chart of the preferred embodiment. As shown in the figure, when producing a radioisotope TI-201 according to the present invention, the following steps are processed:

(a) Electroplating 1: A TI-203 solid target material 12 is obtained from a plated target material 11 of TI-203 through electroplating.

(b) Irradiating 2: The TI-203 solid target material 12 is irradiated with a proton beam by using a cyclotron 21, where an irradiation energy of the cyclotron 21 is located between fifteen mega electron volts (MeV) and forty MeV.

(c) Processing a first chemical separation: The first chemical separation 3 comprises the following steps:

- (c1) Dissolving 31: After the irradiating, the TI-203 solid target material 12 is dissolved with a strong acid liquid 34 to obtain a Pb-201 solution 35 and a TI-203 solution 36, where the strong acid liquid 34 is a solution of nitric acid having ferric iron (HNO3/Fe3/H2O).
- (c2) Processing a precipitation 32: Ammonia (NH3) and water 321 are added to the Pb-201 solution 35 and the TI-203 solution 36 for a precipitation to separate out a TI-201 liquid 37 and a Pb-201 liquid 38; and
- (c3) Processing a first ion exchange 33: Hydrochloric acid (HCl) 331 is added to the TI-201 liquid 37 and the Pb-201 liquid 38 for a first ion exchange by using a resin 332 with impurities filtered out;

(d) Decaying 4: The Pb-201 liquid is taken out to be decayed into a TI-201 liquid 41.

(e) Processing a second chemical separation: And a second chemical separation 5 is processed, which is a second ion exchange 51.

- (e1) Processing a second ion exchange 51: An HCl acid having sulfur dioxide ($SO_2$) 511 is added to the TI-201 liquid 41 to obtain a TI-201 liquid 52 having a high purity through a second ion exchange by using a resin 512.

Thus, a novel radioisotope TI-201 production process is obtained.

To sum up, the present invention is a radioisotope TI-201 production process, where a TI-203 solid target material is formed through an electroplating; the TI-203 solid target material is irradiated with a proton beam; the TI-203 solid target material is dissolved to be processed through a first chemical separation and a second chemical separation; and a TI-201 liquid is quickly filtered out, which has a high purity.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A radioisotope TI-201 production process, comprising steps of:

- (a) Electroplating: wherein a TI-203 solid target material is obtained from a plated target material of TI-203 through electroplating;

(b) Irradiating: wherein said TI-203 solid target material is irradiated with a proton beam by using a cyclotron;

(c) Processing a first chemical separation: wherein said TI-203 solid target material is dissolved with a strong acid liquid to be separated into a TI-201 liquid and a Pb-201 liquid with impurities filtered out;

(d) Decaying: wherein said Pb-201 liquid is obtained to be decayed into a TI-201 liquid; and (e) Processing a second chemical separation: wherein a TI-201 liquid having a high purity is obtained through filtering, wherein said step (c) comprises steps of:

(c1) Dissolving: wherein, after said irradiating, said TI-203 solid target material is dissolved with a strong acid liquid to obtain a Pb-201 solution and a TI-203 solution;

(c2) Processing a precipitation: wherein ammonia ($NH_3$) and water are applied to said Pb-201 solution and said TI-203 solution for a precipitation to obtain a TI-201 liquid and a Pb-201 liquid; and (c3) Processing a first ion exchange: wherein hydrochloric acid (HCl) is applied to said TI-201 liquid and said Pb-201 liquid for an ion exchange by using a resin with impurities filtered out, wherein said strong acid liquid used in step (c1) is a solution of nitric acid having ferric iron ($HNO_3/Fe_3/H_2O$), wherein step (e) is a second ion exchange; and wherein an HCl having sulfur dioxide ($SO_2$) is applied to said TI-201 liquid to obtain a TI-201 liquid having a high purity through a second ion exchange by using a resin.

2. The process according to claim 1, wherein an irradiation energy of said cyclotron in step (b) is located between 15 mega electron volts (MeV) and 40 MeV.

3. A radioisotope TI-201 production process, comprising steps of:

(a) Electroplating: wherein a TI-203 solid target material is obtained from a plated target material of TI-203 through electroplating;

(b) Irradiating: wherein said TI-203 solid target material is irradiated with a proton beam by using a cyclotron;

(c1) Dissolving: wherein, after said irradiating, said TI-203 solid target material is dissolved with a strong acid liquid to obtain a Pb-201 solution and a TI-203 solution;

(c2) Processing a precipitation: wherein $NH_3$ and water are applied to said Pb-201 solution and said TI-203 solution for a precipitation to obtain a TI-201 liquid and a Pb-201 liquid;

(c3) Processing a first ion exchange: wherein HCl is applied to said TI-201 liquid and said Pb-201 liquid for an ion exchange by using a resin with impurities filtered out;

(d) Decaying: wherein said Pb-201 liquid is obtained to be decayed into a TI-201 liquid; and (e1) Processes a second ion exchange: wherein an HCl having $SO_2$ is applied to said TI-201 liquid to obtain a TI-201 liquid having a high purity through an second ion exchange by using a resin, wherein said strong acid liquid used in step (c1) is $HNO_3/Fe_3/H_2O$.

4. The process according to claim 3, wherein an irradiation energy of said cyclotron in step (b) is located between 15 MeV and 40 MeV.

* * * * *